United States Patent [19]

Mettetal

[11] 4,397,474
[45] Aug. 9, 1983

[54] STEERING STABILIZER AND QUICK COUPLING ASSEMBLY

[75] Inventor: Bert J. Mettetal, Tecumseh, Mich.

[73] Assignee: Truck Safety Systems, Inc., Tecumseh, Mich.

[21] Appl. No.: 259,884

[22] Filed: May 4, 1981

[51] Int. Cl.³ .............................................. B62D 53/06
[52] U.S. Cl. ................................ 280/423 A; 280/408; 280/476 R; 280/492
[58] Field of Search .............. 280/408, 423 A, 476 R, 280/476 A, 411 R, 411 C, 426, 442, 492, 81 B

[56] References Cited

U.S. PATENT DOCUMENTS

| | | | |
|---|---|---|---|
| 2,153,309 | 4/1939 | Milz et al. | 280/492 |
| 3,151,881 | 10/1964 | Walther | 280/423 R |
| 4,162,082 | 7/1979 | Curry | 280/423 A |
| 4,262,920 | 4/1981 | Mett et al. | 280/476 R |

Primary Examiner—Joseph F. Peters, Jr.
Assistant Examiner—Donn McGiehan
Attorney, Agent, or Firm—Cullen, Sloman, Cantor, Grauer, Scott & Rutherford

[57] ABSTRACT

A steering stabilizer and quick coupling assembly for a multi-trailer combination or train consists of a tractor, a towing or lead trailer, a steerable dolly and a rear or towed trailer. The assembly minimizes the oscillatory yaw and rollover tendency between the towed trailer and its steerable dolly. It also provides for quick coupling or uncoupling between the lead or towing trailer and the towed trailer. Further, it prevents off-tracking steering misalignment between the lead trailer and the steerable dolly. The assembly is mounted between the lead and rear trailers, and has as its basic components, a drawbar member and coupler assembly which are pivotally coupled and uncoupled at a vertical pivot on the drawbar member. The drawbar member and coupler assembly are each pivotally connected to a respective trailer frame portion for movement only about a transverse horizontal axis, and the vertical pivot is preferably located substantially midway between the transverse horizontal pivot axes. The vertical pivot may be fixed to the drawbar member or mounted for limited universal pivoting relative to the drawbar member. The coupler assembly includes spaced apart coupler members which are connected together at one end to a common support and unconnected at their opposite ends thereby permitting the drawbar member to be sandwiched therebetween for coupling.

11 Claims, 8 Drawing Figures

STEERING STABILIZER AND QUICK COUPLING ASSEMBLY

BACKGROUND OF THE INVENTION

The present invention relates to a steering stabilizer and quick coupling assembly for a multi-trailer combination or train comprising a self-propelled tractor constituting the No. 1 element of the so-called train; a towing, lead or first trailer constituting the No. 2 element of the train; a wheeled and steerable vehicle or dolly constituting the No. 3 element of the train; and a towed or second trailer constituting the No. 4 element of the train. One object of the invention is to minimize the oscillatory yaw behavior and rollover tendency between the second or last trailer or No. 4 element and its steerable dolly or No. 3 element. Another object of the invention is to provide quick coupling or uncoupling between the lead or first trailer and the towed or second trailer. A further object of the invention is to prevent off-tracking steering misalignment between the lead trailer or No. 2 element of the train and the steerable dolly or the No. 3 element of the train.

Numerous types of trailer dolly and hitch arrangements are known in the prior art as being adapted to allow one trailer to be hitched to and pulled behind another trailer, and these prior art dolly and hitch arrangements are mainly responsible for the problem of lack of stability experienced by the multitrailer combinations.

It is conventional, for example, to connect the lead or first trailer or No. 2 element to the steerable dolly or No. 3 element by means of a drawbar hitch arrangement. The drawbar hitch is pivotally connected at one of its ends to the rear frame portion of the lead trailer for both horizontal and vertical pivoting, whereas its other end is pivotally connected to the front end of the steerable dolly for pivoting only about a transverse horizontal axis. A problem with using a drawbar as the connection between the lead trailer and second trailer is that the second trailer receives no rollover support from the lead trailer.

Further, the majority of dollies or rotatable wheeled vehicles (No. 3 elements) used for coupling multi-trailer combinations, have no means to prevent or limit rotation of the No. 3 element in a horizontal plane about the hitch point on the rear of a pulling trailer. These conventional dollies are provided with a hitch on the forward end of the drawbar which allows the dolly or No. 3 element to freely pivot in such horizontal plane. Additionally, stability against rollover, i.e., pivoting about a longitudinal horizontal axis of the last trailer or No. 4 element with respect to the towing or first trailer or No. 2 element, is exceptionally low because the No. 3 element has a conventional trailer coupler, or fifth wheel, above the axle which is pivotally engaged with the towed or second trailer or No. 4 element in the same manner as the conventional fifth wheel on the tractor or No. 1 element is pivotally engaged with the first trailer or No. 2 element. Thus, the last trailer receives no roll support from the lead or towing semi-trailer, particularly in evasion type maneuvers.

The steering stabilizer and quick coupling assembly of the present invention is applicable to all multi-trailer trailer tractor combinations, but it finds special application for tandem or double-bottom tankers because of their unique stability problems. Double tankers typically carry approximately 9,000 gallons of fuel in the lead or towing tanker and approximately 7,000 gallons of fuel in the trailing or second tanker. The lead trailer or No. 2 element by law is the heaviest vehicle of the so-called train. The obvious reason for using tandem tankers is to reduce the number of tractors and operators required, theoretically reducing the likelihood of accidents and decreasing costs including costs of operation.

Unfortunately, the rollover stability and sway stability of known double bottom tanker combinations is exceptionally low, particularly in accident-evasion type maneuvers. This problem is accentuated because, unlike other multi-trailer combinations, the tandem tankers are frequently towed when they are only partially loaded with fuel. The sudden movement or sloshing of the fuel within the tankers during high speed or emergency maneuvers drastically decreases the roll and sway stability of the last trailer or No. 4 element.

The double tanker combination has definite stability problems, with the primary problem residing in the behavior of the second trailer or No. 4 element of the train. In emergency lane change maneuvers, the second trailer amplifies the yaw motions of the tractor and towing trailer. At a high frequency range of steering inputs, the second trailer or No. 4 element experiences roll or overturning accelerations which are more than twice as large as that experienced at the tractor or No. 1 element. In addition to oscillatory yaw behavior, the second trailer has a low level of basic rollover immunity. In a steady turn situation, the rollover limit of the loaded second trailer is approximately 20% lower than that exhibited by most heavy commercial vehicles. For emergency lane changes, the double tanker will experience rollover at a maneuvering level which is less than half of the maneuvering level that is needed to roll over conventional tractor, semi-trailer combinations. Thus, the known double tanker combination exhibits an exceptionally low degree of yaw and roll stability with the second trailer or No. 4 element contributing most significantly to the problem.

Another problem associated with conventional trailer dolly and drawbar hitch arrangements is that during sharp turning maneuvers, an off-tracking steering misalignment occurs between the lead trailer or No. 2 element of the train and the steerable dolly or No. 3 element of the train. During normal steering maneuvers by the tractor and good road conditions, a conventional A-frame drawbar provides adequate trailer connection between the lead trailer and the second trailer such that the second trailer generally follows the path of the towing or lead trailer. However, during sharp turning maneuvers and off-road conditions, a conventional drawbar connection causes steering misalignment between the rear wheels on the lead trailer and the wheels supporting the steerable dolly which results in additional wear on the steerable dolly wheels and generally poor steerability. Thus, there has been a need for a connection between the lead trailer and steerable dolly which prevents off-tracking steering misalignment between the lead trailer and steerable dolly thereby improving steering and maneuverability.

A further problem with conventional drawbar connections between the lead trailer and steerable dolly is that it is difficult and inconvenient to connect or disconnect the forward end of the drawbar and the lead trailer. Maneuvering the lead trailer into a position where it is aligned with the forward end of the drawbar is a timeconsuming process. After the rear end of the lead trailer and drawbar are aligned for attachment, the actual hook-up using conventional fasteners, involves a considerable amount of additional time and labor. Thus, there has been a need for a quick coupling and uncoupling mechanism between the lead trailer and towed or second trailer to replace the conventional A-frame drawbar thereby reducing the labor and time involved in making the necessary connection.

It is accordingly the general objective of the present invention to provide a rollover and steering stabilizer apparatus between a lead or towing trailer (No. 2 element) and a towed or second trailer (No. 4 element) which minimizes oscillating yaw behavior of the second trailer, provides roll support from the lead trailer to the second trailer, and increases the basic rollover immunity of the second trailer. Another objective of the present invention is to provide a mechanism for quick coupling or uncoupling between the lead or first trailer and the towed or second trailer. A further objective of the invention is to prevent off-tracking steering misalignment between the lead trailer and the steerable dolly during sharp turning maneuvers.

SUMMARY OF THE INVENTION

The steering stabilizer and quick coupling assembly of the present invention includes a single trailer connection linkage apparatus mounted between a first, lead or towing semi-trailer and a second, trailing or towed semi-trailer. The assembly may, in connection with a new trailer, be manufactured as part of the original frames of the lead and second trailers or, in the case of a used trailer, the apparatus may be retrofitted or added to the existing frames. The purpose of the steering stabilizer and quick coupling assembly is to minimize or eliminate the oscillating yaw behavior of the second trailer and to provide roll support to the second trailer. Additionally, the assembly permits quick coupling and uncoupling between the lead trailer and second trailer and prevents off-tracking steering misalignment between the trailers for improved steering and maneuverability.

The steering stabilizer and quick coupling assembly is mounted between the lead and rear trailers, and it has as its basic components a drawbar member and coupler assembly which are pivotally interconnected by a vertical pivot pin. The drawbar member is pivotally connected at its forward end to the rear frame portion of the lead trailer for movement only about a transverse horizontal axis. Similarly, the coupler assembly is pivotally connected at its rearward end to the steerable towing dolly for movement only about a transverse horizontal axis. The vertical pivot pin is preferably located approximately midway between the transverse horizontal axes to prevent off-tracking steering between the lead and rear trailers. It is also within the scope of the present invention that the drawbar member be mounted to the rear trailer and that the coupler assembly be mounted to the lead trailer or that the vertical pivot be located at a position other than midway between the horizontal pivot axes.

The vertical pivot pin is typically fixed to the drawbar member when the steering stabilizer assembly is being used on multi-trailer combinations that experience normal steering maneuvers and good road conditions. For off-road maneuvers and steering, the invention contemplates mounting the vertical pivot pin using a spherical bushing assembly which permits limited universal pivoting of the pivot pin relative to the drawbar member. This prevents undue stress on the pivot pin when the axles of the trailers are rocking relative to one another because of off-road conditions.

In a preferred embodiment of the invention, the drawbar member is generally planar and includes the vertical pivot pin mounted thereto at a position rearwardly of the horizontal pivot connection between the drawbar member and the lead trailer. The coupler assembly includes spaced apart coupler members which are mounted at their rearward ends to a common support located adjacent to the horizontal pivot axis between the coupler assembly and steerable dolly. The coupler members extend forwardly from the common support in a generally cantilevered fashion with their forward ends being unconnected thereby permitting the drawbar and vertical pivot pin to be sandwiched therebetween for coupling. Releasing mechanisms are mounted within the coupler members for selective locking engagement with the opposed ends of the vertical pivot pin on the drawbar member.

Each releasing mechanism includes a pair of pivotal locking jaws and a linearly movable yoke selectively engageable with the locking jaws. The yoke is shifted in response to movement of a release handle between a first position where it holds the locking jaws in locking engagement around a portion of the vertical pivot pin on the drawbar member and a second position where it is out of engagement with the locking jaws thereby permitting uncoupling between the drawbar member and coupler assembly. Thus, the present invention provides a convenient and quick means for coupling and uncoupling the lead and rear trailers which is a distinct improvement over conventional cumbersome drawbar connections.

The steering stabilizer and quick coupling assembly of the present invention provides rigidity to the frame of the No. 3 element against oscillating yaw behavior and rollover such that the level of dynamic stability of the baseline train is substantially increased. With this trailer connection fitted between the lead and rear trailers, the baseline train is conceptually reduced from a four element vehicle (tractor, lead trailer, dolly frame, rear trailer) to a three element vehicle (tractor, lead trailer, rear trailer) and therefore, the rear or second trailer does not experience the overturning accelerations during sudden and severe maneuvers of the tractor that, without the tractor connection of the present invention, are more than twice as large as that experienced at the tractor during such maneuvers. A tandem trailer or tanker combination fitted with this unique trailer connection or steering stabilizer will have a stability level comparable to that of the tractor and lead trailer portion of the baseline train alone.

The present invention permits the tractor and lead trailer to aid in the stabilization of the rear or second trailer. In rapid maneuvers, the tractor or No. 1 element of the train is the first element of the train to respond to dynamic stimulus, then the lead lead trailer or No. 2 element and finally the rear or second trailer or No. 4 element. The tractor and lead trailer are already past a peak roll stimulus before the second trailer is stimulated by the same overturning stresses, and further, the tractor and lead trailer normally experience less rollover stimulus than the second trailer. The steering stabilizer and quick coupling assembly of the present invention helps the lead trailer to hold the rear or second trailer from overturning when the baseline train is rapidly maneuvered causing overturning accelerations.

The steering stabilizer and quick coupling assembly can be economically constructed for original installation or retrofitting on existing double tanker combinations, and an existing double tanker, retrofitted with such trailer connection, will experience substantially greater dynamic stability than is possible with existing dolly hitches alone. The construction of the present invention provides numerous advantages over the prior art including reduction of the oscillating yaw behavior of the rear or second trailer, supporting of the second trailer against rollover and prevention of off-tracking steering misalignment between the trailers.

Other advantages and meritorious features of the invention will be more fully appreciated from the following detailed description and the appended claims.

DETAILED DESCRIPTION OF THE INVENTION

Figure 1:
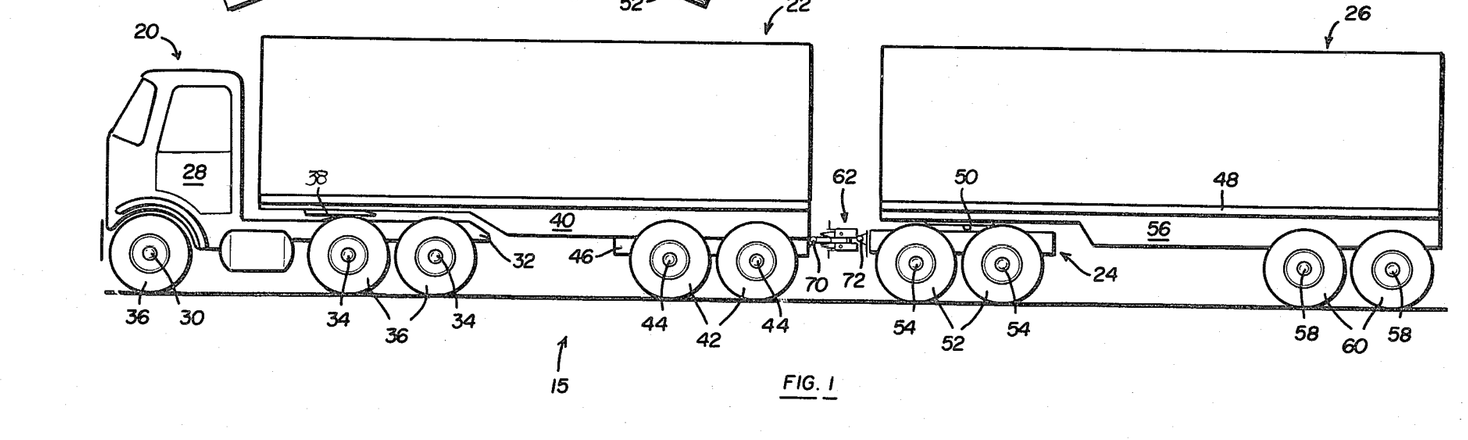
FIG. 1 is an overall side elevational view of a tractor pulling tandem trailers connected by the steering stabilizer and quick coupling assembly of the present invention.

The teachings of the present invention, as discussed herein, are applicable to a wide variety of road vehicles regardless of the use of the vehicles. The multi-trailer combination may be used as tankers for carrying gasoline, oil, milk or other liquids, and for trailers carrying conventional shipping containers or other types of cargo such as steel, etc. Referring to FIG. 1, the multi-trailer combination, train or assembly 15 includes a power unit or self-propelled tractor 20 constituting the No. 1 element of the so-called train; a towing, lead or first trailer 22 constituting the No. 2 element of the train; a wheeled and steerable vehicle or dolly 24 constituting the No. 3 element of the train; and a towed or second trailer 26 constituting the No. 4 element of the train. The tanker units, as illustrated, are designed to carry a flammable liquid. The tractor or No. 1 element 20 includes a forwardly disposed operator's cab 28 mounted directly over the tractor front axle 30. The tractor 20 includes a chassis 32 which carries the tractor rear drive axles 34. Drive wheels 36 are provided on the front and rear axles 30, 34 of the tractor or No. 1 element 20.

The lead or first trailer 22 is connected to tractor 20 by a conventional relatively flexible hitch 38 including a pivotally mounted fifth wheel connected to a kingpin (not shown) on the front end of the first trailer 22. With such an assembly relative pivotal movement is permitted between the tractor 20 and first trailer 22 constituting the No. 1 element and the No. 2 element, respectively. The first trailer 22 or No. 2 element includes a trailer bed or frame 40 including longitudinally extending and laterally spaced support members as is well-known in the art. The rear end portion of the lead trailer 22 or No. 2 element is supported by two sets of dual road engaging wheels 42 mounted on axles 44, and the axles 44 are mounted to the underside of the trailer bed 40 on a rear frame portion 46.

The towed or second tanker or trailer 26 or No. 4 element is provided with a trailer frame 48 including a pair of elongated channel-shaped members extending longitudinally. The front part of the rear trailer frame 48 is connected to another conventional flexible hitch 50 including a pivotally mounted fifth wheel connected to a kingpin (not shown) on the front end of the second trailer 26. The fifth wheel assembly 50 is mounted on the dolly frame of an independently steerable wheeled vehicle 24, constituting the No. 3 element of the so-called train. The steerable vehicle 24 has ground engaging wheels 52 mounted on axles 54. The rear end of the second trailer bed 48 is supported on a rear frame portion 56 to which is mounted axles 58 and ground engaging wheels 60.

Figure 2:
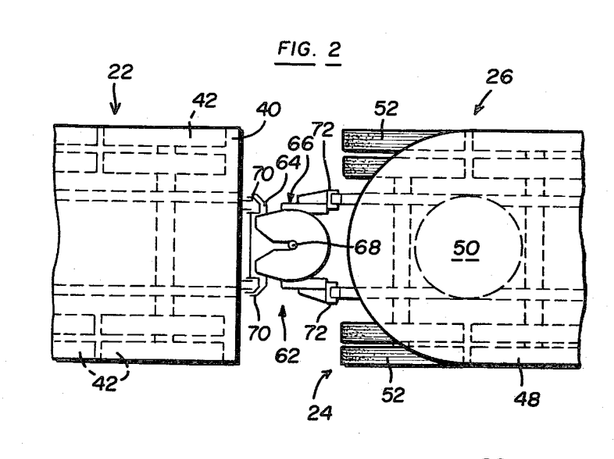
FIG. 2 is a partial top view of the baseline train with the tanker units removed for easier viewing of the trailer frames and their connection.
Figure 3:
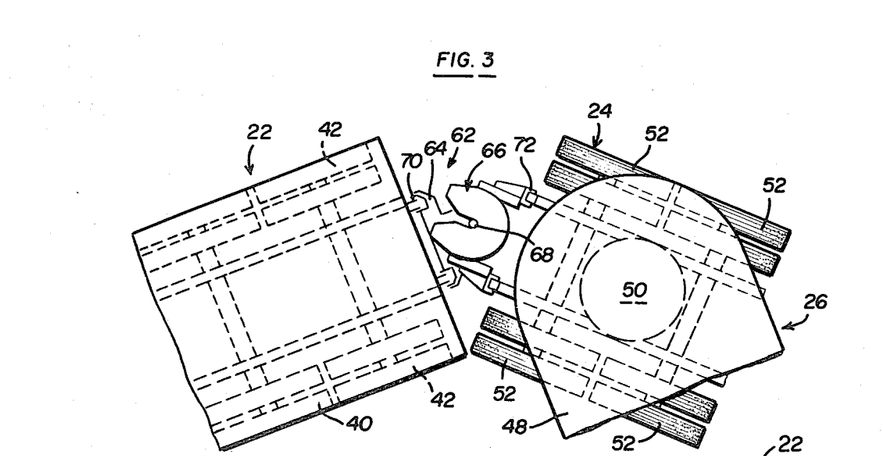
FIG. 3 is a partial top view similar to FIG. 2 showing the trailers in an extreme steering maneuver.

Referring to FIGS. 2 and 3, the multi-trailer combination 15 is shown with the tanker units 22 and 26 removed from the trailer frames 40 and 48 for easier viewing of the features provided by the present invention.

The front end of the second trailer 26 is connected to the frame 24 of the No. 3 element by a conventional flexible hitch 50 including a pivotally mounted fifth wheel connected to a kingpin on the front end of the second trailer 26, as is conventional in the art whereby the No. 4 element is mounted for relative pivotal movement on the fifth wheel of the No. 3 element. Under steady turning conditions, the rollover limit for the second trailer is approximately 20% less than that for conventional commercial vehicles, and for emergency lane changes, second trailer rollover occurs at a maneuvering level which is one-half that needed to roll over conventional tractor-semi-trailer combinations.

The steering stabilizer and quick coupling assembly 62 of the present invention provides the needed support from the lead or first trailer 22 to the second trailer 26, thereby minimizing the oscillating yaw behavior and rollover tendency between the second trailer 26 and its steerable dolly 24.

A more detailed description of the structure and features that form a part of the steering stabilizer and quick coupling trailer connection 62 of the present invention will be found by reference to FIGS. 4-8.

Figure 4:
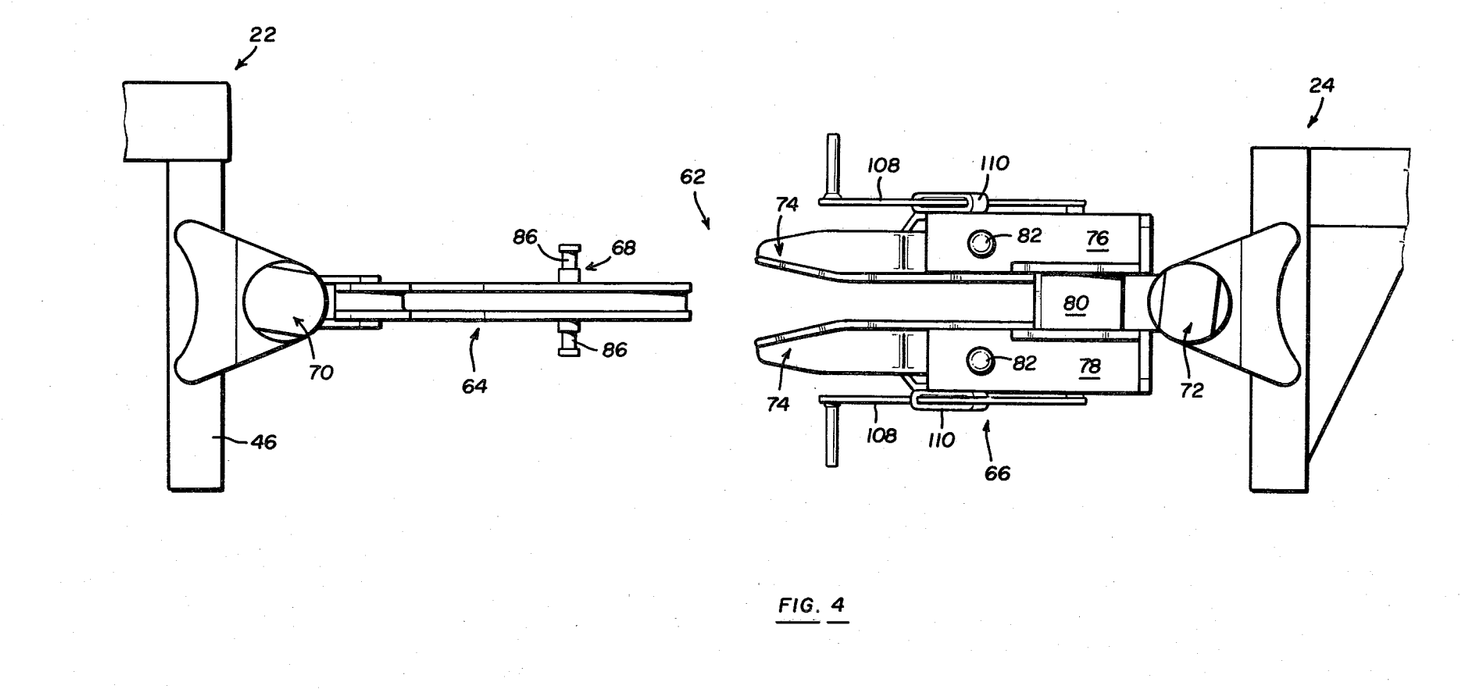
FIG. 4 is a side elevational view of the steering stabilizer and quick coupling assembly, illustrating the drawbar member and coupler assembly separated from one another.
Figure 5:
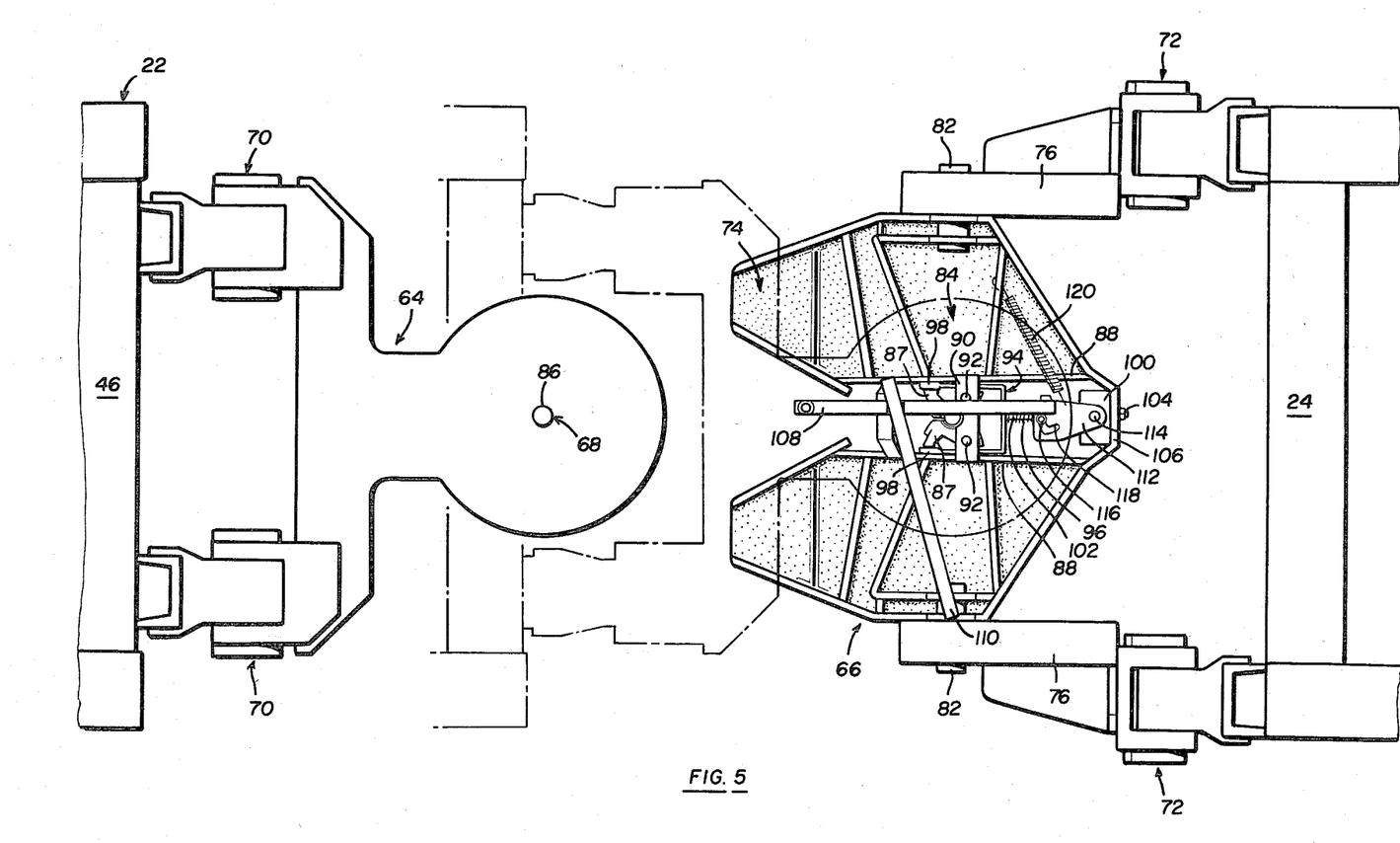
FIG. 5 is a top plan view of the steering stabilizer and quick coupling assembly illustrated in FIG. 4.

The steering stabilizer and quick coupling assembly 62 has as its basic components a drawbar member 64 and coupler assembly 66 which are pivotally interconnected by a vertical pivot pin 68. The drawbar member 64 is pivotally connected at its forward end by bearing assemblies 70 to the rear frame portion 46 of lead trailer 22 for movement only about a transverse horizontal axis. Coupler assembly 66 is pivotally connected at its rearward end by bearing assemblies 72 to the steerable towing dolly 24 for movement only about a transverse horizontal axis. Thus, drawbar member 64 and coupler assembly 66 are held in a cantilevered fashion for pivoting only about the horizontal pivot axes formed by bearing assemblies 70 and 72.

While drawbar member 64 is illustrated as being attached to lead trailer frame 46 and coupler assembly 66 is illustrated as being connected to steering dolly 24, it is also within the scope of the present invention that coupler assembly 66 be connected to the lead trailer 22 and that drawbar member 64 be connected to the rear trailer or steerable dolly 24.

Vertical pivot pin 68 is preferably located substantially midway between the transverse horizontal pivot axes formed by bearing assemblies 70 and 72 for the purpose of preventing off-tracking steering misalignment between the lead trailer 22 and rear trailer 26. Referring to FIG. 3, it can be seen that during normal steering maneuvers, the location of pivot pin 68 permits the steerable dolly wheels 52 to generally follow the path of wheels 42 on the towing or lead trailer 22. The problem with using a conventional drawbar is that wheels 52 become misaligned from the general tracking or steering radius of the multi-trailer combination which results in additional wear on the wheels 52 supporting steerable dolly 24, loss of traction and generally poor steerability. Thus, the location of pivot pin 68 substantially midway between horizontal bear assemblies 70 and 72 prevents undesirable off-tracking misalignment between the lead trailer 22 and steerable dolly 24 thereby improving steering and maneuverability.

In the preferred embodiment of the invention illustrated in FIGS. 4 and 5, drawbar member 64 is generally planar and includes vertical pivot pin 68 fixed thereto at a position rearwardly of the horizontal pivot connection 70 between drawbar member 64 and lead trailer 22. Coupler assembly 66 includes spaced apart coupler members 74 which are mounted at their rearward ends to a common support assembly including upper and lower beams 76, 78, spacers 80, and pins 82. Beams 76, 78 are welded or otherwise secured to bearing assembly 72 thereby providing a cantilevered support arrangement for coupler members 74. Coupler members 74 are generally parallel and extend forwardly from their common support assembly in a generally cantilevered fashion with their forward ends being unconnected, thereby permitting drawbar member 64 and pivot pin 68 to extend between them for coupling as shown in FIGS. 1–3.

A coupling and uncoupling or releasing mechanism 84 is mounted to each coupler member 74 for selective locking engagement with the opposed connecting portions 86 (FIG. 4) of vertical pivot pin 68. The illustrated releasing mechanism 84 is similar in construction to a conventional coupling mechanism used on fifth wheel assemblies such as the Holland Series 3500 fifth wheel coupler manufactured by Holland Hitch Company. While the preferred embodiment of the invention is illustrated by using identical releasing mechanisms 84 mounted to upper and lower coupler members 74, the invention may be practiced with only one releasing mechanism in either the upper or lower coupler member or by using different releasing mechanisms than the one illustrated.

Referring to FIG. 5, each coupling and uncoupling or releasing mechanism 84 includes a pair of pivotal locking jaws 87 which are secured to opposed coupler member ribs 88 by support 90 and pivot pins 92. A linearly movable yoke 94 having a shank portion 96 and depending legs 98 selectively engages locking jaws 87 for holding them in a coupled position around a respective connecting portion 86 on pivot pin 68. Yoke shank 96 extends through support block 100 for linear movement and is provided with a compression spring 102 for biasing yoke 94 towards its engaged position with locking jaws 87, as illustrated in FIG. 5. The movement of yoke 94 towards locking jaws 87 in response to biasing by spring 102 is limited by the engagement of adjustable stop or lock nut 104 against frame member 106.

Yoke 94 is shifted out of engagement with locking jaws 87, or to the right as viewed in FIG. 5, in response to the manual movement or pivoting by an operator of release handle 108 within its slide support 110. Release handle 108 is connected at one end to a cam plate 112 that is pivotally mounted on support block 100 by pivot pin 114. Roller assembly 116 is attached to yoke shank 96 and is movable in cam recess 118 in response to pivoting of cam plate 112 for causing yoke 94 to shift linearly. Cam plate 112 is biased by spring 120 against pivotal movement by release handle 108.

As described, yoke 94 is shifted linearly in response to pivotal movement by release handle 108 between a first position as illustrated in FIG. 5 where it holds locking jaws 87 in locking engagement around a respective connecting portion 86 on pivot pin 68 and a second position (not shown) where it is out of engagement with locking jaws 87 thereby permitting uncoupling between drawbar member 64 and coupler assembly 66. Further details of the construction and operation of the releasing mechanism 84 illustrated in FIG. 5 are unnecessary, since by itself, the releasing mechanism forms only a part of the present invention.

The present invention including a releasing mechanism 84 as illustrated or its equivalent provides a convenient and quick means for coupling and uncoupling the lead trailer 22 and rear trailer 26 which is a distinct improvement over conventional cumbersome drawbar connections.

Figure 6:
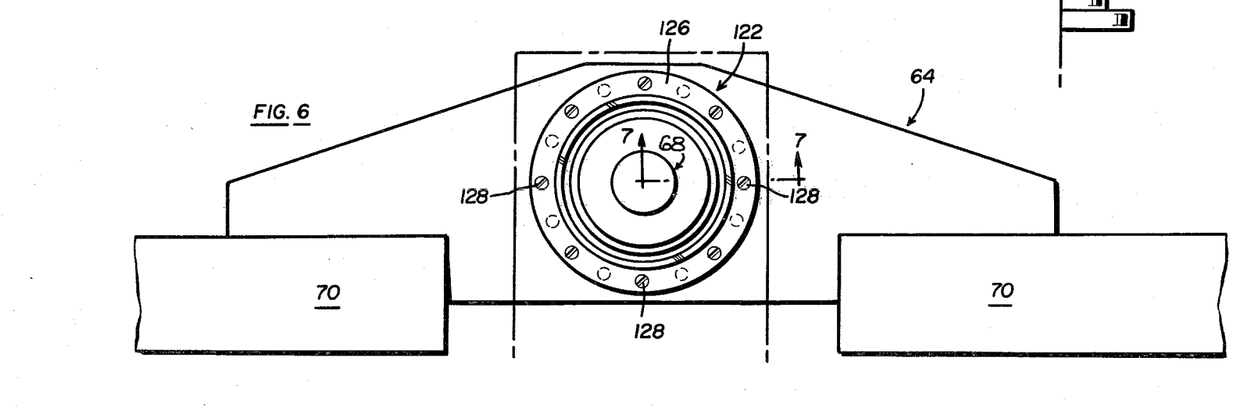
FIG. 6 is a top plan view of a drawbar member including a vertical pivot pin which has been mounted for limited universal pivoting.
Figure 7:
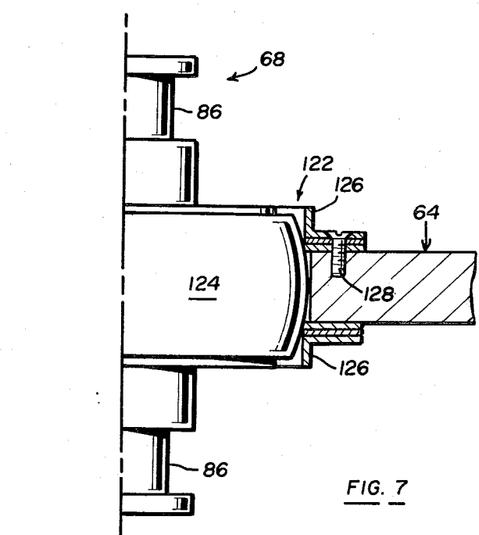
FIG. 7 is a cross-sectional view taken along line 7—7 in FIG. 6.
Figure 8:
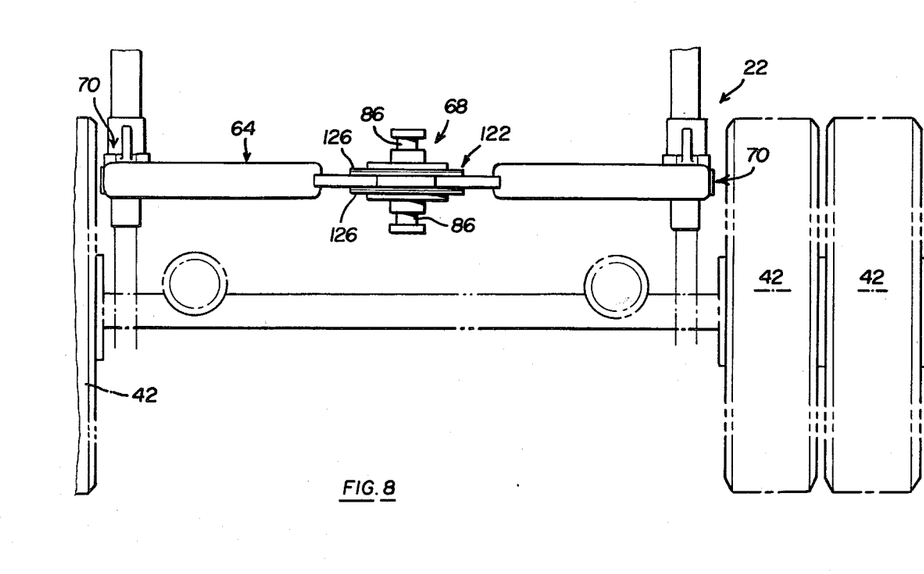
FIG. 8 is a rear view of the drawbar member and vertical pivot pin illustrated in FIG. 6.

Vertical pivot pin 68 is typically fixed to drawbar member 64 when the steering stabilizer assembly 62 is used on multi-trailer combinations that experience steering maneuvers over relatively good road conditions. For off-road maneuvers and steering such as would be experienced with dump trailers or the like, the invention contemplates mounting the vertical pivot pin 68 using a spherical bushing assembly 122, as illustrated in FIGS. 6–8, which permits limited universal pivoting of pivot pin 68 relative to drawbar member 64. This prevents undue stress on pivot pin 68 when the axles, such as 44 and 54, are rocking relative to one another because of off-road conditions.

Referring to FIGS. 6–8, the spherical bushing assembly 122 which permits limited universal pivoting of pivot pin 68, includes a spherical bushing 124 interconnecting the opposed connecting portions 86 of pivot pin 68. Bushing 124 is mounted within drawbar member 64 by a housing formed by opposed cover plates 126, one of which being secured to drawbar member 64 by fasteners 128, thereby permitting easy removal of pivot pin 68 for repair or replacement. Thus, pivot pin 68 is permitted limited pivoting about a vertical axis to prevent undue stress on the pivot joint during off-road steering and maneuvering.

The operation of the steering stabilizer and quick coupling assembly 62 of the present invention is best described by reference to FIGS. 2–3. FIG. 2 shows the rear of the lead or first trailer 22 and the front of the second trailer 26 longitudinally aligned under normal straight driving conditions. During rapid maneuvering around a sharp corner, for example, the tractor 20 generates the steering signal for the multi-trailer combination 15. As the No. 1 element or tractor turns, the No. 2 element or lead trailer 22 moves forward in a straight line. The No. 3 element or dolly vehicle 24 turns, as the weight of the No. 4 element or second trailer 26 moves forward in a straight line. With the use of the steering stabilizer 62, the No. 3 element cannot be forced to turn when the force of the No. 4 element is applied except upon direction or signal from the tractor 20. The trailer connection 62 helps the lead trailer 22 to hold the second trailer 26 from overturning when the baseline train suddenly experiences overturning accelerations. The lead trailer 22 is already past its peak roll stimulus point before the second trailer 26 is stimulated by the same overturning stresses, and thus, the lead trailer 22 through the steering stabilizer trailer connection 62 helps to hold the second trailer 26 against the same overturning stresses experienced by it, thereby dynamically stabilizing the entire baseline train.

The element of steering control previously described becomes important when the multi-vehicle or trailer combination 15 or so-called train is operated in reverse. It is no longer required to use a mechanical locking pin between the No. 3 and No. 4 elements to control the pivotal action of the dolly 24 or No. 3 element in relation to the second trailer 26 since the steering control is provided by the stabilizer 62. When backing up or reversing the train, the same steering motion is used as in the forward direction described previously. The train 15 can be backed up in a straight line or backed up on a curve or radius to get into difficult locations.

It will be apparent to those skilled in the art that the foregoing disclosure is exemplary in nature rather than limiting, the invention being limited only by the appended claims.

I claim:

1. A trailer assembly adapted to be transported by a tractor comprising a lead trailer having front and rear frame portions, said front frame portion of said lead trailer being adapted to be pivotally connected to the tractor, a rear trailer having front and rear frame portions, a steerable towing vehicle located under the front frame portion of said rear trailer, said rear trailer being pivotally connected to said steerable towing vehicle, a steering stabilizer and quick coupling assembly pivotally connected at one end to said rear frame portion of said lead trailer and pivotally connected at its other end to said steerable towing vehicle, said steering stabilizer and quick coupling assembly including a drawbar member having one end pivotally connected to the rear frame portion of said lead trailer for movement only about a first horizontal axis and a coupler assembly having one end pivotally mounted to said steerable towing vehicle for movement only about a second horizontal axis, releasable means for pivotally connecting said drawbar member to said coupler assembly for movement about a vertical pivot axis whereby said steering stabilizer and quick coupling assembly provides rollover stability from said lead trailer to said rear trailer and permits quick coupling and uncoupling between said lead trailer and said rear trailer, said drawbar member including a vertical pivot pin forming said vertical pivot axis between said drawbar member and said coupler assembly, means for mounting said pivot pin to said drawbar member, said mounting means permitting limited universal movement of said pivot pin on said drawbar member and said releasable means being mounted to said coupler assembly for selective coupling and uncoupling with said vertical pivot pin.

2. A trailer assembly adapted to be transported by a tractor comprising a lead trailer having front and rear frame portions, said front frame portion of said lead trailer being adapted to be pivotally connected to the tractor, a rear trailer having front and rear frame portions, a steerable towing vehicle located under the front frame portion of said rear trailer, said rear trailer being pivotally connected to said steerable towing vehicle, a steering stabilizer and quick coupling assembly pivotally connected at one end to said rear frame portion of said lead trailer and pivotally connected at its other end to said steerable towing vehicle, said steering stabilizer and quick coupling assembly including a drawbar member having one end pivotally connected to the rear frame portion of said lead trailer for movement only about a first horizontal axis and a coupler assembly having one end pivotally mounted to said steerable towing vehicle for movement only about a second horizontal axis, releasable means for pivotally connecting said drawbar member to said coupler assembly for movement about a vertical pivot axis whereby said steering stabilizer and quick coupling assembly provides rollover stability from said lead trailer to said rear trailer and permits quick coupling and uncoupling between said lead trailer and said rear trailer, said drawbar member being generally planar and including a vertical pivot pin mounted rearwardly of said first horizontal pivot axis, said vertical pivot pin forming said vertical pivot axis between said drawbar member and said coupler assembly, said vertical pivot pin extending through said drawbar member and including upper and lower connecting portions, said coupler assembly including spaced apart upper and lower coupling members, said releasable means including a first releasing mechanism mounted to said upper coupler member and a second releasing mechanism mounted to said lower coupler member, said drawbar member extending between said coupler members and being pivotally coupled to said coupler assembly by selective locking engagement between said releasing mechanisms and said upper and lower connecting portions of said pivot pin.

3. The trailer assembly as defined in claim 2 wherein each of said coupler members being mounted at their rearward ends to a common support means located adjacent to said second horizontal pivot axis, said coupler members extending forwardly from said support means in a generally cantilevered fashion with their forward ends being unconnected thereby permitting said drawbar and vertical pivot pin to freely extend between them.

4. The trailer assembly as defined in claim 2 wherein each releasing mechanism includes a pair of pivotal locking jaws and a linearly movable yoke selectively engageable with said locking jaws, a movable release handle operably connected to said yoke for shifting said yoke between a first position where said yoke holds said locking jaws in locking engagement around a respective connecting portion of said vertical pivot pin and a second position where said yoke is moved out of engagement with said locking jaws thereby permitting said vertical pin connecting portion to be uncoupled from said locking jaws.

5. In a trailer assembly adapted to be transported by a tractor comprising a lead trailer having front and rear frame portions, said front frame portion of said lead trailer being pivotally connected to said tractor and at lead one rear trailer connected to said lead trailer, said rear trailer having a front frame portion, the improvement which comprises a steering stabilizer and quick coupling trailer connection pivotally mounted at one end to said rear frame portion of said lead trailer and pivotally mounted at its other end to said front frame portion of said rear trailer, said steering stabilizer and quick coupling trailer connection including a first member having one end pivotally connected to the rear frame portion of said lead trailer for movement only about a first transverse horizontal axis and a second member having one end pivotally mounted to said front frame portion of said rear trailer for movement only about a second transverse horizontal axis, releasable means mounted to one of said members for pivotally connecting said first member to said second member for movement about a vertical pivot axis, said vertical pivot axis being located substantially midway between said first and second transverse horizontal axes whereby said steering stabilizer and quick coupling trailer connection provides stabilizing from said lead trailer to said rear trailer, permits quick coupling and uncoupling between said trailers, and prevents off-tracking steering misalignment between said trailers, said first member being generally planar and including a vertical pivot pin mounted rearwardly of said first horizontal pivot axis, said vertical pivot pin forming said vertical pivot axis between said first member and second member, said vertical pivot pin extending through said first member and including upper and lower connecting portions, said second member including spaced apart upper and lower coupler portions, said releasable means including a first releasing mechanism mounted to said upper coupler portion and a second releasing mechanism mounted to said lower coupler portion, said first member extending between said coupler portions and being pivotally coupled to said second member by selective locking engagement between said releasing mechanisms and said upper and lower connecting portions of said pivot pin.

6. The trailer assembly as defined in claim 5 wherein each of said coupler portions being mounted at their rearward ends to a common support means located adjacent to said second horizontal pivot axis, said coupler portions extending forwardly from said support means in a generally cantilevered fashion with their forward ends being unconnected thereby permitting said first member and vertical pivot pin to freely extend between them.

7. The trailer assembly as defined in claim 6 wherein each releasing mechanism includes a pair of pivotal locking jaws and a linearly movable yoke selectively engageable with said locking jaws, a movable release handle operably connected to said yoke for shifting said yoke between a first position where said yoke holds said locking jaws in locking engagement around a respective connecting portion of said vertical pivot pin and a second position where said yoke is moved out of engagement with said locking jaws thereby permitting said vertical pin connecting portion to be uncoupled from said locking jaws.

8. In a trailer assembly adapted to be transported by a tractor comprising a lead trailer having front and rear frame portions, said front frame portion of said lead trailer being pivotally connected to said tractor and at least one rear trailer connected to said lead trailer, said rear trailer having a front frame portion, the improvement which comprises a steering stabilizer and quick coupling trailer connection pivotally mounted at one end to said rear frame portion of said lead trailer and pivotally mounted at its other end to said front frame portion of said rear trailer, said steering stabilizer and quick coupling trailer connection including a first member having one end pivotally connected to the rear frame portion of said lead trailer for movement only about a first transverse horizontal axis and a second member having one end pivotally mounted to said front frame portion of said rear trailer for movement only about a second transverse horizontal axis, releasable means mounted to one of said members for pivotally connecting said first member to said second member for movement about a vertical pivot axis, a vertical pivot pin mounted on one of said members between said first and second horizontal axes for forming said vertical pivot axis between said members, the other of said members including spaced apart upper and lower coupler portions, each of said coupler portions being mounted at one of its ends to a common support means, said coupler portions extending from said support means in a generally cantilevered fashion with their opposite ends being unconnected, said releasable means including a releasing mechanism mounted to one of said coupler portions, and said pivot pin extending between said coupler portions and said members being pivotally coupled by selective locking engagement between said releasing mechanism and said pivot pin.

9. The trailer assembly as defined in claim 8 wherein said vertical pivot pin being located substantially midway between said first and second horizontal axes thereby preventing off-tracking steering misalignment between said lead trailer and said rear trailer.

10. The trailer assembly as defined in claim 8 including means for mounting said vertical pivot pin for permitting limited universal movement of said pivot pin.

11. The trailer assembly as defined in claim 8 wherein said releasing mechanism includes a pair of pivotal locking jaws and a linearly movable yoke selectively engageable with said locking jaws, a movable release handle operably connected to said yoke for shifting said yoke between a first position where said yoke holds said locking jaws in locking engagement around said vertical pivot pin and a second position where said yoke is moved out of engagement with said locking jaws thereby permitting said vertical pivot pin to be uncoupled from said locking jaws.

* * * * *